Jan. 21, 1969   W. JUDA ET AL   3,423,244
METHOD OF OPERATING A FUEL CELL COMPRISING A HYDROGEN
DIFFUSION OTHERWISE IMPERMEABLE ANODE
Filed Sept. 12, 1963

WALTER JUDA
MARTIN S. FRANT INVENTORS

BY *Rines and Rines*
ATTORNEYS

United States Patent Office 3,423,244
Patented Jan. 21, 1969

3,423,244
METHOD OF OPERATING A FUEL CELL COMPRISING A HYDROGEN DIFFUSION OTHERWISE IMPERMEABLE ANODE
Walter Juda, Lexington, and Martin S. Frant, Newton, Mass., assignors to Prototech Incorporated, Cambridge, Mass., a corporation of Massachusetts
Continuation-in-part of application Ser. No. 260,457, Feb. 25, 1963. This application Sept. 12, 1963, Ser. No. 308,417
U.S. Cl. 136—86                       1 Claim
Int. Cl. H01m 27/06, 27/20

ABSTRACT OF THE DISCLOSURE

Fuel cells are disclosed in which the resistance of a thin hydrogen-permeable otherwise impervious layer with one surface in contact with a high temperature electrolyte is substantially reduced by short-circuiting closely-spaced regions of the opposite surface of the layer while permitting access of hydrogen thereto.

---

The present invention relates to fuel cell electrodes and the like, and, more specifically, to conducting electrode supports for thin palladium-containing layers and the like that minimize internal resistance; this application being a continuation-in-part of copending application, Ser. No. 260,457, filed on or about Feb. 25, 1963, for "Fuel Cell System and Method."

Porous carbon and other supports are described in the said copending application for carrying thin hydrogen-permeable, but otherwise impermeable, palladium-containing layers such as Pd-Ag or Pd-B films and the like. When the area of such layers is increased, as in the case of providing large area anodes in fuel cells or in similar applications, however, the series electrical resistance along the length of the layer increases and the actual contact resistance between the layer and the connection therefrom to the external circuit becomes of considerable importance. As an example, for a fuel cell with electrodes having each 3½ cm.² in area (such as 21 mm. carbon electrodes, for example), a current of 1.75 amps would be drawn at 0.5 volt at a current density of 500 ma./cm.². This means that the total internal cell resistance would have to be less than 0.3 ohm. Internal contact resistances adding up to a few tenths of an ohm can therefore not be tolerated.

It is to the problem of avoiding appreciable internal contact resistance, accordingly, that the present invention is primarily directed; it being an object of the invention to provide a minimum internal resistance structure more particularly adapted for large-area fuel cell electrodes and the like.

A further object is to provide a novel electrode structure of more general utility, as well.

Figure 1:
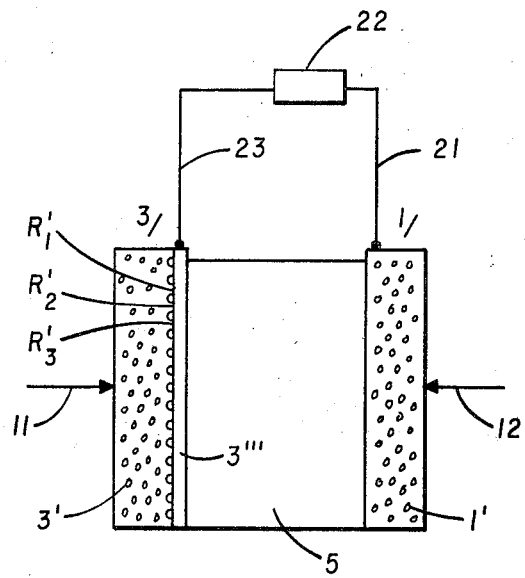
Figure 2:
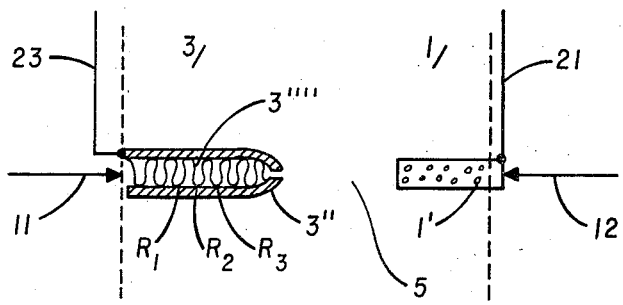

Other objects will be pointed out in the appended claim, the invention being now described in connection with the accompanying drawing, FIG. 1 of which is a longitudinal section of one embodiment of the invention; and FIG. 2 is a similar view of a preferred modification.

Referring to the drawing, a thin hydrogen-permeable palladium-containing anoed layer is shown in planar form at 3''' in FIG. 1 and in thin tubular form at 3'' in FIG. 2, contacting an electrolytic medium 5 in which a cathode 1 is disposed, such as a porous carbon electrode 1'. The palladium-containing layers should be made as thin as possible in order to obtain the best hydrogen diffusion characteristics and the lowest cost; but current must be removed from the anode 3 comprising the palladium-containing layer. If the output conductor 23 is connected to remove current from the edges or ends of a thin palladium-containing foil, layer or tube, the lengthwise resistance of the same, particularly for large area sizes, becomes too great, as before explained. Connection to the end of a thin-walled 15 cm., Pd-Ag tube 3'' (67%–33%), 3 mils in wall thickness and 1/16 inch in outer diameter, for example, was found to provide an intolerable resistance of 0.16 ohm at room temperature, which increased as the temperature of operation of the cell increased. Decided limitations are thus imposed on available output current in the external load 22 fed by conductors 23 and 21 from the respective anode and cathode electrodes 3 and 1, as fuel (such as hydrogen, for example) is fed at 11 through the porous anode 3, and oxidant (such as chlorine, for example) is applied through the porous cathode 1 at 12. In the fuel cell example given, the electrolytic medium 5 may, as described in the said application, be a molten chloride-salt medium (LiCl-KCl) maintained at or about 450° C.; so that the internal contact resistance increases considerably further at such high temperature.

It has been discovered that this resistance limitation can be obviated, even for large-area anodes, by short-circuiting closely-spaced regions of the substantially complete surface of the palladium-containing layer to one another while still permitting access of the gaseous fuel to and through said surface into the electrolytic medium 5. In the embodiment of FIG. 2, this is effected by a corrugated or zig-zag conductor member or support 3'''' that short-circuits closely-spaced regions $R_1$, $R_2$, $R_3$, etc., to one another along the interior surface area of the Pd-Ag tube 3'' through which the hydrogen fuel, applied to the interior of the tube at 11, is passed into the electrolytic medium 5. The open nature of the shorting turns still permits the interior wall surface of the tube 3'' to be exposed to the fuel, and connection of the external output-circuit conductor 23 to the left-hand edge or end of the tube provides negligible internal resistance irrespective of the length (and thus area) of the tube. In the previous example, thusly shorting successive regions of the 15 cm. Pd-Ag tube produced a contact-resistance of only 0.0104 ohm. The tube had a small terminal aperture, as shown.

This same shorting of closely-spaced regions may be effected by supporting the thin planar palladium-containing layer as film 3''' of FIG. 1 by a porous carbon or other conductive anode support 3', the portions of which on opposite sides of the pores adjacnt the layer 3''' provide the shorting-circuiting action before described, as at $R_1'$, $R_2'$, $R_3'$, etc. The pores still enable the fuel to pass through the layer 3'''. Though the external conductor 23 be connected to the edge of the thin layer 3''', and though that layer may have considerable area, the contact resistance has been reduced to a tolerable minimum value by this technique.

Further modifications will also occur to those skilled in the art and all such are considered to fall within the spirit and scope of the invention as set forth in the appended claim.

What is claimed is:

1. A method of increasing the operating current of a fuel cell having a source of hydrogen-containing fuel and having a molten electrolyte at a temperature of at least of the order of 450 degrees C. in contact with an oxidant electrode provided with a source of oxidant, which comprises providing a hydrogen-permeable otherwise gas impervious fuel electrode layer with one surface thereof in uninterrupted direct contact with said electrolyte, supplying fuel from said source to the opposite surface of said layer, providing an operating current circuit including conductors connected to said oxidant electrode and to one end of said layer, said layer being sufficiently thin and having sufficient area to permit substantial diffusion of hydrogen therethrough to meet predetermined operating current requirements of which said cell with said layer is theoretically capable, but said layer having an intolerably high resistance to the flow of operating current along the layer relative to said conductor connected thereto so as to reduce the operating current of said cell substantially below said requirements, interposing a multi-apertured, highly conductive electrical support between said source of fuel and said opposite surface of said layer, and electrically and mechanically securing said layer to said support at said opposite surface thereof, thereby reducing the area of said opposite surface exposed to said fuel, for short-circuiting closely spaced regions of said opposite surface to reduce the said high resistance to a tolerable value at which the operating current is increased from its reduced value to meet the said current requirements, and for supporting said layer while providing a sufficient flow of said fuel through said support to said layer regardless of the reduction of the area of said opposite surface of said layer exposed to said fuel.

References Cited

UNITED STATES PATENTS

| | | | |
|---|---|---|---|
| 3,259,523 | 7/1966 | Faris et al. | 136—86 |
| 3,291,643 | 12/1966 | Oswin et al. | 136—86 |
| 3,235,407 | 2/1966 | Nicholson et al. | 136—86 |
| 2,384,463 | 9/1945 | Gunn et al. | 136—86 |
| 2,969,315 | 1/1961 | Bacon | 136—86 |
| 3,146,131 | 8/1964 | Linden et al. | 136—86 |
| 3,147,149 | 9/1964 | Postal | 136—120 |
| 3,186,872 | 6/1965 | Ewing | 136—86 |

WINSTON A. DOUGLAS, *Primary Examiner.*

H. FEELEY, *Assistant Examiner.*